United States Patent
Peng et al.

(10) Patent No.: US 11,774,755 B2
(45) Date of Patent: Oct. 3, 2023

(54) NEAR-EYE OPTICAL SYSTEM

(71) Applicant: Coretronic Corporation, Hsin-Chu (TW)

(72) Inventors: Kuei-En Peng, Hsin-Chu (TW); Chih-Wei Shih, Hsin-Chu (TW); Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 239 days.

(21) Appl. No.: 17/088,584

(22) Filed: Nov. 4, 2020

(65) Prior Publication Data

US 2021/0141220 A1  May 13, 2021

Related U.S. Application Data

(60) Provisional application No. 62/931,810, filed on Nov. 7, 2019.

(30) Foreign Application Priority Data

Jan. 21, 2020 (CN) .......................... 202020135919.2
Sep. 2, 2020 (CN) .......................... 202021886834.4

(51) Int. Cl.
*G02B 27/01* (2006.01)
*G02B 6/34* (2006.01)
*F21V 8/00* (2006.01)

(52) U.S. Cl.
CPC ........... *G02B 27/0101* (2013.01); *G02B 6/34* (2013.01); *G02B 27/0172* (2013.01); *G02B 6/0016* (2013.01); *G02B 2027/0187* (2013.01)

(58) Field of Classification Search
CPC .. G02B 27/0101; G02B 27/0172; G02B 6/34; G02B 6/0016; G02B 2027/0187
(Continued)

(56) References Cited

U.S. PATENT DOCUMENTS 7,545,569 B2 * 6/2009 Cassarly .............. G02B 6/0053
                                                    359/624
8,189,263 B1 * 5/2012 Wang ................. G02B 27/0172
                                                    359/633

(Continued)

OTHER PUBLICATIONS

"Search Report of Europe Counterpart Application", dated Apr. 9, 2021, p. 1-p. 10.

*Primary Examiner* — Collin X Beatty
(74) *Attorney, Agent, or Firm* — JCIPRNET

(57) ABSTRACT

A near-eye optical system, for receiving an image beam, includes an optical waveguide, configured to expand the image beam in a direction, and including a near-eye surface and a structure surface. The structure surface includes a light incident area and is opposite to the near-eye surface. The light incident area is located in a transmission path of the image beam. A plurality of reflective inclined surfaces are disposed on the structure surface and located at one side of the light incident surface and arranged along the direction. The structure surface is sequentially divided into the light incident area and a plurality of optical areas along the direction. A line number density of the reflective inclined surfaces in the optical area closest to the light incident area in the direction is less than a line number density of the reflective inclined surfaces in the optical area furthest from the light incident area in the direction.

15 Claims, 8 Drawing Sheets

(58) Field of Classification Search
USPC .......................................................... 359/34
See application file for complete search history.

(56) References Cited

U.S. PATENT DOCUMENTS

| | | | |
|---|---|---|---|
| 8,446,675 | B1 | 5/2013 | Wang et al. |
| 8,503,087 | B1 * | 8/2013 | Amirparviz ........ G02B 27/0172 |
| | | | 359/850 |
| 8,662,686 | B2 * | 3/2014 | Takagi ............... G02B 27/0172 |
| | | | 359/861 |
| 8,743,464 | B1 * | 6/2014 | Amirparviz ........ G02B 27/0081 |
| | | | 359/633 |
| 10,551,544 | B2 * | 2/2020 | Danziger ............. G02B 27/283 |
| 10,564,417 | B2 * | 2/2020 | Danziger ................. G02B 6/26 |
| 11,422,376 | B2 * | 8/2022 | Ishihara ............. G02B 27/0081 |
| 2008/0198471 | A1 | 8/2008 | Amitai |
| 2012/0300311 | A1 * | 11/2012 | Simmonds ......... G02B 27/0172 |
| | | | 359/630 |
| 2017/0315358 | A1 | 11/2017 | Masuda |
| 2017/0336552 | A1 | 11/2017 | Masuda et al. |
| 2018/0329208 | A1 | 11/2018 | Masuda |

* cited by examiner

NEAR-EYE OPTICAL SYSTEM

CROSS-REFERENCE TO RELATED APPLICATION

This application claims the priority benefit of U.S. provisional application Ser. No. 62/931,810, filed on Nov. 7, 2019, China application serial no. 202020135919.2, filed on Jan. 21, 2020 and China application serial no. 202021886834.4, filed on Sep. 2, 2020. The entirety of the above-mentioned patent application is hereby incorporated by reference herein and made a part of this specification.

TECHNICAL FIELD

The invention relates to an optical system, and more particularly, to a near-eye optical system.

BACKGROUND

Augmented Reality (AR) is mainly composed of two main components: a projection device and an optical waveguide. The optical waveguide is currently divided into a geometric optical waveguide and a diffractive optical waveguide. Among them, the geometric optical waveguide is further divided into a mirror array type and a microstructure type. The geometric optical waveguide of the mirror array-type uses a plurality of coatings with different transmissive and reflective rates to achieve a uniform light output. However, its manufacturing process is quite complicated, and the requirements for the coatings with the transmissive and reflective rates of and a parallel degree between the coatings are extremely high and difficult to mass produce. The geometric optical waveguide of the microstructure type has a micro-prism array on an upper surface of a light output area so the uniform light output can be achieved after beams hit the micro-structures. Therefore, its manufacturing process is much simpler compared with the mirror array type and easier to mass produce.

However, for the geometric optical waveguide of the microstructure type, during an optical waveguide conduction of an emitted light from a display device, because the light incident at different angles are not all output at expected light output areas, a displayed image may show an uneven light distribution. Consequently, as a part of the light cannot enter human eyes, visible dark lines will be seen on the displayed image.

For example, incident light that enter the optical waveguide at different angles will go through different numbers of total reflections in a designed transmission path before being transmitted to user eyes. Among them, the incident light undergone fewer total reflections need to be output earlier to be received by the eyes. Conversely, the incident light undergone more total reflections need to be output later. However, in practical applications, the incident light undergone fewer total reflections is not designed to be output earlier. Instead, the incident light that has undergone more total reflections is designed to be output earlier. Consequently, the waste of energy affects the energy incident on the eyes of the user. In addition, the above-mentioned light output problem also causes obvious bright and dark stripes on the image received by the eyes, resulting in a poor user experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a near-eye optical system, which can provide a favorable light output effect.

An embodiment of the invention provides a near-eye optical system for receiving an image beam, which includes a first optical waveguide and a second optical waveguide. The first optical waveguide is configured to expand an image beam in a first direction, and includes a first surface, a second surface and a plurality of first reflective inclined surfaces. The first surface has a first light incident area. The second surface is opposite to the first surface. The first reflective inclined surfaces are disposed on the first surface, located at one side of the first light incident area-surface, and arranged along the first direction. The first surface is sequentially divided into the first light incident area and a plurality of first optical areas along the first direction. A line number density of the first reflective inclined surfaces in the first optical area closest to the first light incident area in the first direction is less than a line number density of the first reflective inclined surfaces in the first optical area furthest from the first light incident area in the first direction. The second optical waveguide is configured to expand the image beam in a second direction. The first direction is vertical to the second direction.

Another embodiment of the invention provides a near-eye optical system for receiving an image beam. The near-eye optical system includes an optical waveguide configured to expand the image beam in a direction. The optical waveguide includes a near-eye surface and a structure surface. The structure surface includes a light incident area and is opposite to the near-eye surface. The light incident area is located in a transmission path of the image beam. A plurality of reflective inclined surfaces are disposed on the structure surface and located at one side of the light incident area and arranged along the direction. The structure surface is sequentially divided into the light incident area and a plurality of optical areas along the direction. A line number density of the reflective inclined surfaces in the optical area closest to the light incident area in the direction is less than a line number density of the reflective inclined surfaces in the optical area furthest from the light incident area in the direction.

Based on the above, the near-eye optical system of the invention has a plurality of reflective inclined surfaces, and a line number density of the reflective inclined surfaces in the optical areas closest to the light incident area in the direction is less than a line number density of the reflective inclined surfaces in the optical areas furthest from the light incident area in the direction. As a result, the near-eye optical system can make light incident at different angles on the eye more uniformly, reduce the occurrence of bright and dark stripes, and provide good experience for the user.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
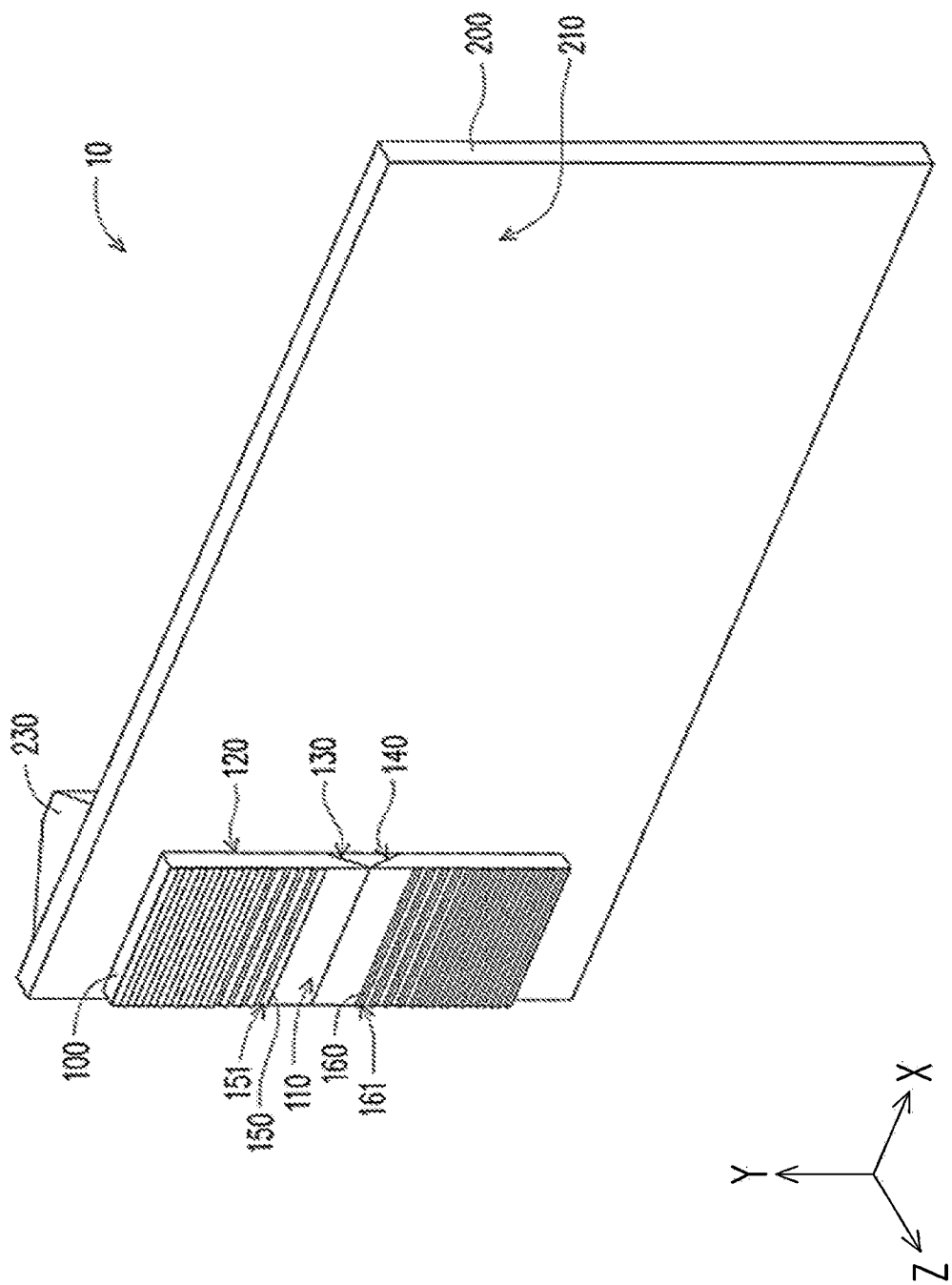
FIG. 1A is a 3D view of the near-eye optical system from a perspective angle according to an embodiment of the invention.
Figure 1B:
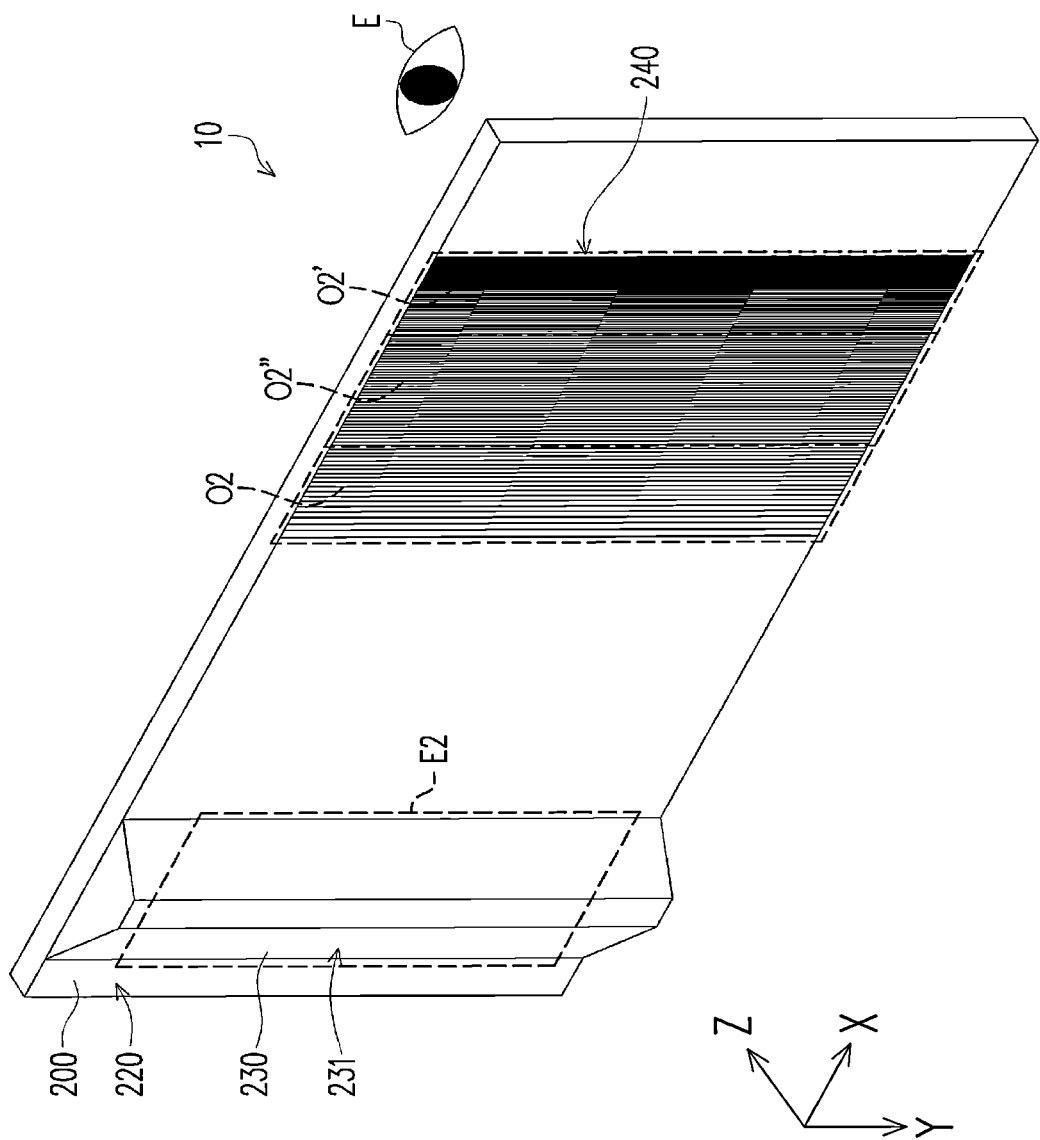
FIG. 1B is a 3D view of the near-eye optical system from another perspective angle according to an embodiment of the invention.
Figure 2:
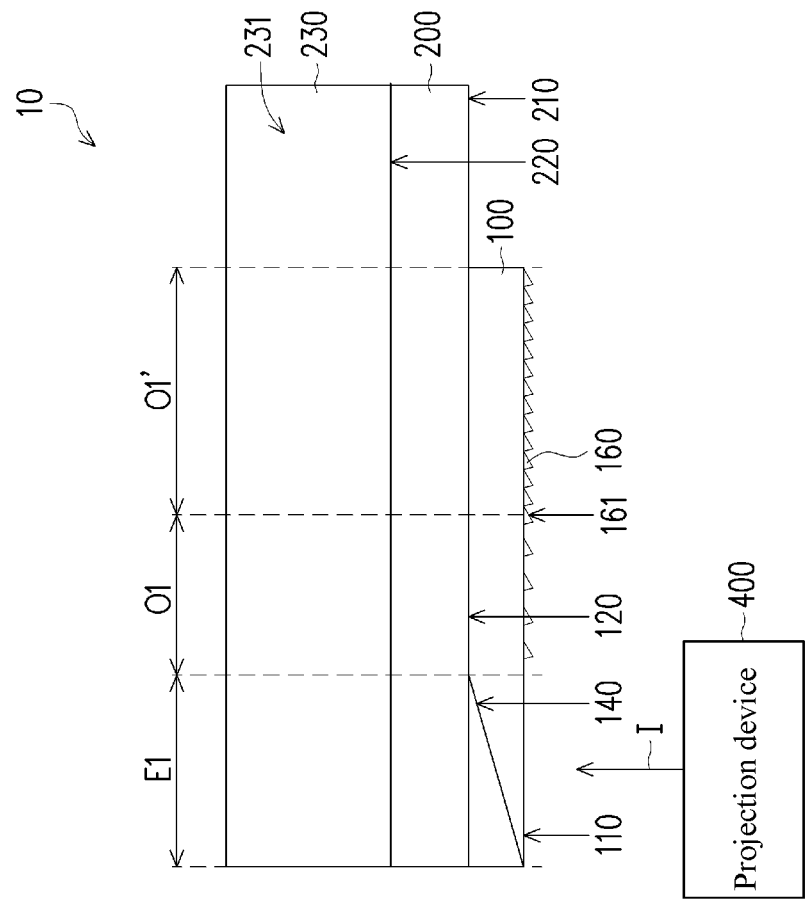
FIG. 2 is a side view of a part of the near-eye optical system according to an embodiment of the invention.

FIG. 1A is a 3D view of the near-eye optical system from a perspective angle according to an embodiment of the invention. FIG. 1B is a 3D view of the near-eye optical system from another perspective angle according to an embodiment of the invention. Referring to FIG. 1A and FIG. 1B together, a near-eye optical system 10 of the present embodiment includes a first optical waveguide 100 and a second optical waveguide 200. A projection device (as shown by FIG. 2) emits an image beam towards a first surface 110, and the image beam is expanded in a Y direction by the first optical waveguide 100 and transmitted to the second optical waveguide 200. The second optical waveguide 200 expands the image beam in an X direction, and causes the image beam to go through at least one total reflection in the second optical waveguide 200 to be reflected by a third reflective inclined surface 240 and incident on an eye E of a user. The first surface 110 includes a first beam splitting inclined surface 130, a second beam splitting inclined surface 140, a plurality of protruding microstructures 150 and a plurality of protruding microstructures 160. The protruding microstructures 150 have a plurality of second reflective inclined surfaces 151, and the protruding microstructures 160 have a plurality of first reflective inclined surfaces 161. The first beam splitting inclined surface 130 and the second beam splitting inclined surface 140 are configured to receive the image beam and guide the image beam to the second reflective inclined surfaces 151 and the first reflective inclined surfaces 161.

The following content will describe how the image beam is guided to the first reflective inclined surfaces 161. The Y direction is an arrangement direction of the first reflective inclined surfaces 161 of FIG. 1A or an extending direction of each of the third reflective inclined surfaces 240 of FIG. 1B, and the X direction is an extending direction of each of the first reflective inclined surfaces 161 of FIG. 1A or an arrangement direction of the third reflective inclined surfaces 240 of FIG. 1B. A Z direction is a direction of a third surface 210 of the second optical waveguide 200 of FIG. 1A facing towards the first surface 110 of the first optical waveguide 100, and the X direction and the Y direction are perpendicular to each other. The first direction is vertical to the second direction.

In this embodiment, materials of the first optical waveguide 100 and the second optical waveguide 200 may be plastic or glass, and their refractive indexes may be the same or different. The first optical waveguide 100 and the second optical waveguide 200 may be bonded by an optical adhesive. For allowing the image beam to go through the total reflection in the first optical waveguide 100 and the second optical waveguide 200, the refractive indexes of the first optical waveguide 100 and the second optical waveguide 200 are more preferably to be greater than refractive indexes of the optical glue and air.

Figure 3:
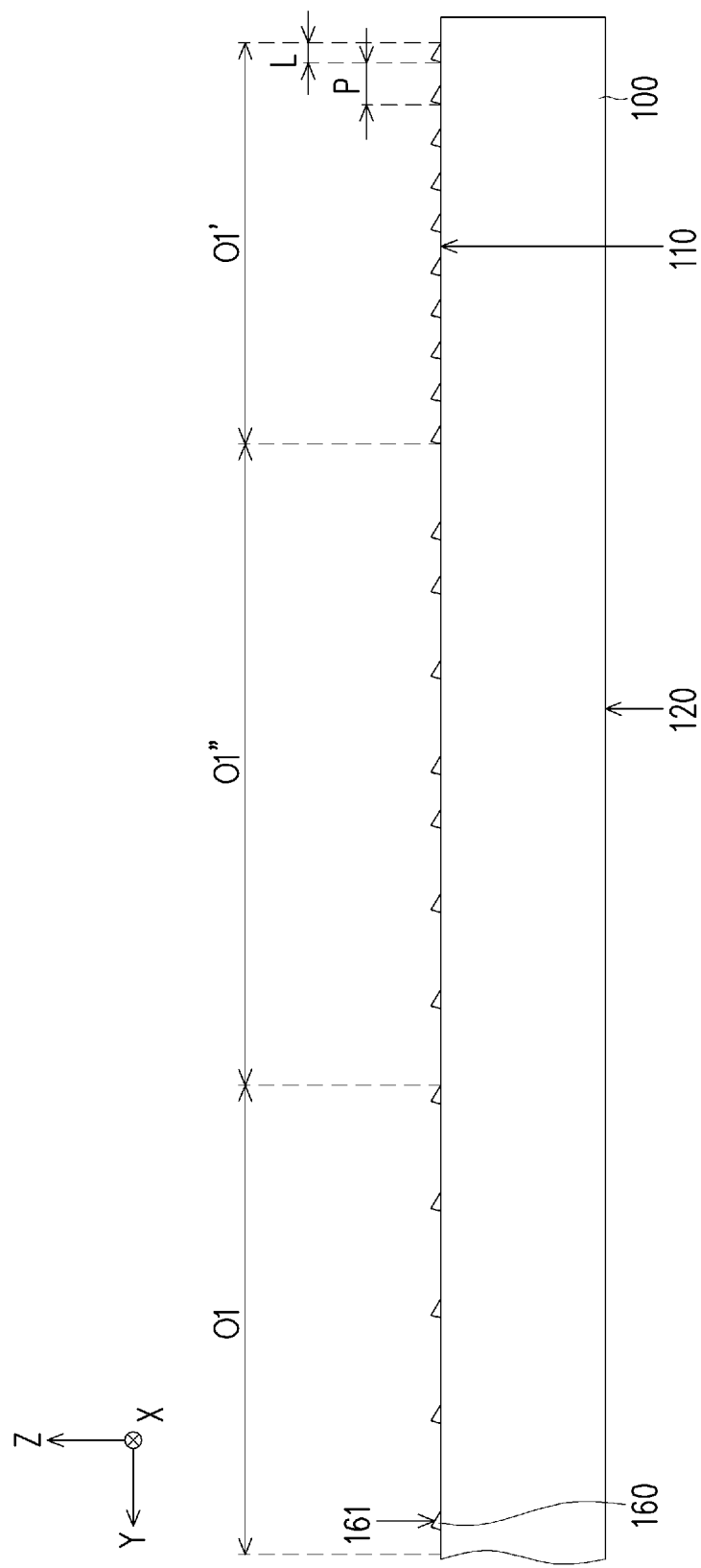
FIG. 3 is a cross sectional view of a first optical waveguide according to an embodiment of the invention.

FIG. 2 is a side view of a part of the near-eye optical system according to an embodiment of the invention. FIG. 3 is a cross sectional view of a first optical waveguide according to an embodiment of the invention. FIG. 2 illustrates an image beam I perpendicularly incident on the first surface 110. However, the image beam I should be in a light cone shape with different incident angles, and a projection device 400 can project the image beam I. Further, FIG. 3 illustrates a part of the first optical waveguide 100, in which a ratio between a dimension of the first reflective inclined surface 161 (e.g., a wide L or a height of the first reflective inclined surface 161) and a dimension of the first optical waveguide 100 are adjusted for convenience of explanation.

Referring to FIG. 2 and FIG. 3 together, specifically, the near-eye optical system 10 according to an embodiment of the invention is used to receive the image beam I. The near-eye optical system 10 further includes the projection device 400 for emitting the image beam I, wherein the image beam I from the projection device 400 enters the first optical waveguide 100 via a first light incident area E1. The first optical waveguide 100 is configured to expand the image beam I in a first direction (e.g., the Y direction), and the first optical waveguide 100 includes the first surface 110, a second surface 120 and the first reflective inclined surfaces 161 of the protruding microstructures 160. The first surface 110 has the first light incident area E1. The second surface 120 is opposite to the first surface 110. The first reflective inclined surfaces 161 are disposed on the first surface 110, and the first reflective inclined surfaces 161 are arranged along the first direction. In addition, the first surface 110 is sequentially divided into the first light incident area E1 and a plurality of first optical areas along the first direction (e.g., first optical areas O1 and O1' illustrated in FIG. 2, and the first optical areas O1, O1' and O1" illustrated in FIG. 3).

In this embodiment, the first reflective inclined surfaces 161 are surfaces of the protruding microstructures 160 on the first surface 110. In other embodiments, the first reflective inclined surfaces 161 may also surfaces of a plurality of micro-depressed surfaces on the first surface 110, but not limited thereto.

Furthermore, in this embodiment, the first optical waveguide 100 further includes the second beam splitting inclined surface 140, which is disposed on the first light incident area E1, and configured to transmit the image beam I from the first light incident area E1 towards the first optical areas O1, O1' and O1". Further, for allowing the image light beam I to be transmitted to the second optical waveguide 200, the first reflective inclined surface 161 is coated with a reflective layer or a partly-transmissive and partly-reflective layer. Alternatively, the first surface 110 and the first reflective inclined surface 161 are coated with a reflective layer or a partly-transmissive and partly-reflective layer. The second beam splitting inclined surface 140 is formed by the partly-transmissive and partly-reflective layer embedded in the first optical waveguide 100.

In addition, for allowing the image beam I at different angles to be evenly incident on the eye E so that the user has a good experience, the first reflective inclined surfaces 161 of the invention may have different pitches P in the different first optical areas O1, O1' and O1". Specifically, a line number density of the first reflective inclined surfaces 161 (representing multiple prism columns) in the first optical area O1 closest to the first light incident area E1 in the first direction is less than a line number density of the first reflective inclined surfaces 161 in the first optical area O1' furthest from the first light incident area E1 in the first direction. It is worth noting that, a plane area is provided between the adjacent first reflective inclined surfaces 161 in the first direction (Y), and a plane area is provided between the adjacent third reflective inclined surfaces 240 in the second direction (X). Besides, the first direction is vertical to the second direction.

Referring to FIG. 2 and FIG. 3, in this embodiment, the line number density of the first reflective inclined surfaces 161 in the first optical area O1 closest to the first light incident area E1 is a constant value (i.e., the pitch between the first reflective inclined surfaces 161 is a fixed value), and the line number density of the first reflective inclined surfaces 161 in the first optical area O1' furthest from the first light incident area E1 is a constant value. For example, in FIG. 3, the pitch P between the first reflective inclined surfaces 161 in the first optical areas O1 is 1 millimeter, and the pitch P between the first reflective inclined surfaces 161 in the first optical areas O1' is 0.4 millimeter. However, the invention is not limited thereto. The line number density and the pitch P of the first reflective inclined surfaces 161 should be determined according to design requirements.

Further, in an embodiment, for example, at least one first optical area O1" is provided between the first optical area O1 closest to the first light incident area E1 and the first optical area O1' furthest from the first light incident area E1, and the line number densities of the first reflective inclined surfaces 161 in the at least one first optical area O1" show a non-increasing and non-decreasing oscillation distribution. For example, in FIG. 3, the pitches P of the at least one first optical area O1" are sequentially 0.9, 0.9, 0.8, 0.5, 0.9, 0.8, 0.5 and 0.9 millimeter in a direction from the first optical area O1 towards the first optical area O1'. However, the invention is not limited thereto. The line number density and the pitch P of the first reflective inclined surfaces 161 in the at least one first optical area O1" should be determined according to design requirements.

In this embodiment, a width L of each of the first reflective inclined surfaces 161 in the first direction is less than or equal to the pitch P from the first reflective inclined surface 161 to the next first reflective inclined surface 161 in the first direction. The pitch P is less than or equal to a pupil diameter of the eye E, and the pupil diameter is greater than or equal to 1 millimeter and less than or equal to 6 millimeter.

In an embodiment, the line number density of the first reflective inclined surfaces 161 increases from being closer to the first light incident area E1 to being farther from the first light incident area E1 in the first direction. It is worth noting that, the first light incident area E1 does not have the structure of the first reflective inclined surface 161.

Figure 4:
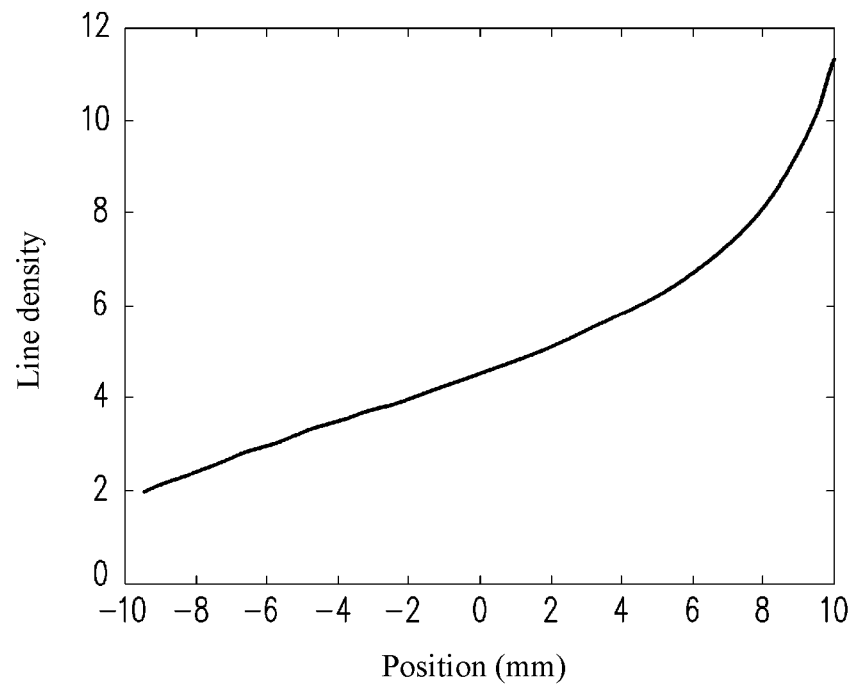
FIG. 4 is an example of using Bezier curve to simulate a line density of reflective inclined surfaces in the embodiment of the invention.
Figure 5:
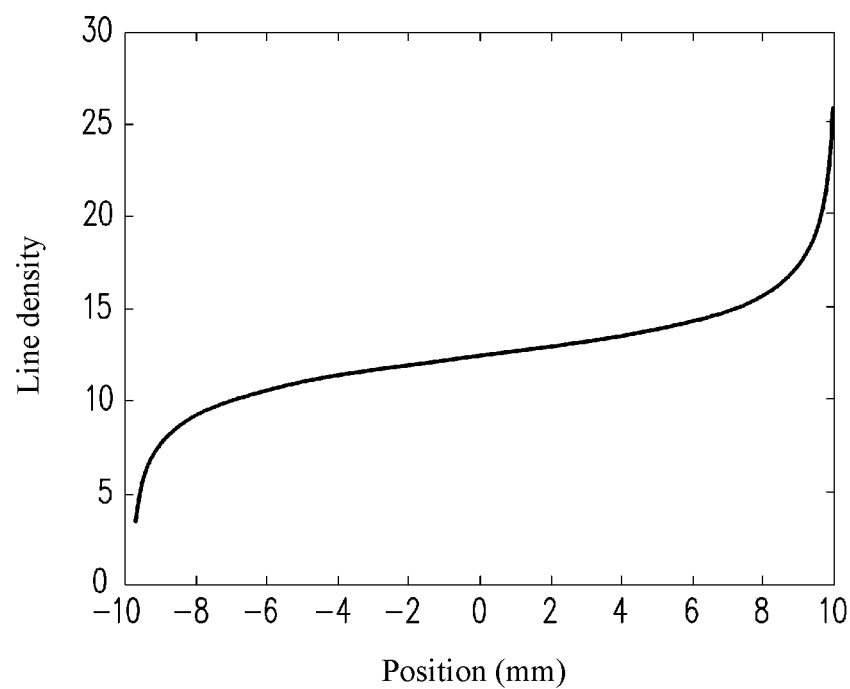
FIG. 5 is another example of using Bezier curve to simulate a line density of reflective inclined surfaces in the embodiment of the invention.
Figure 6:
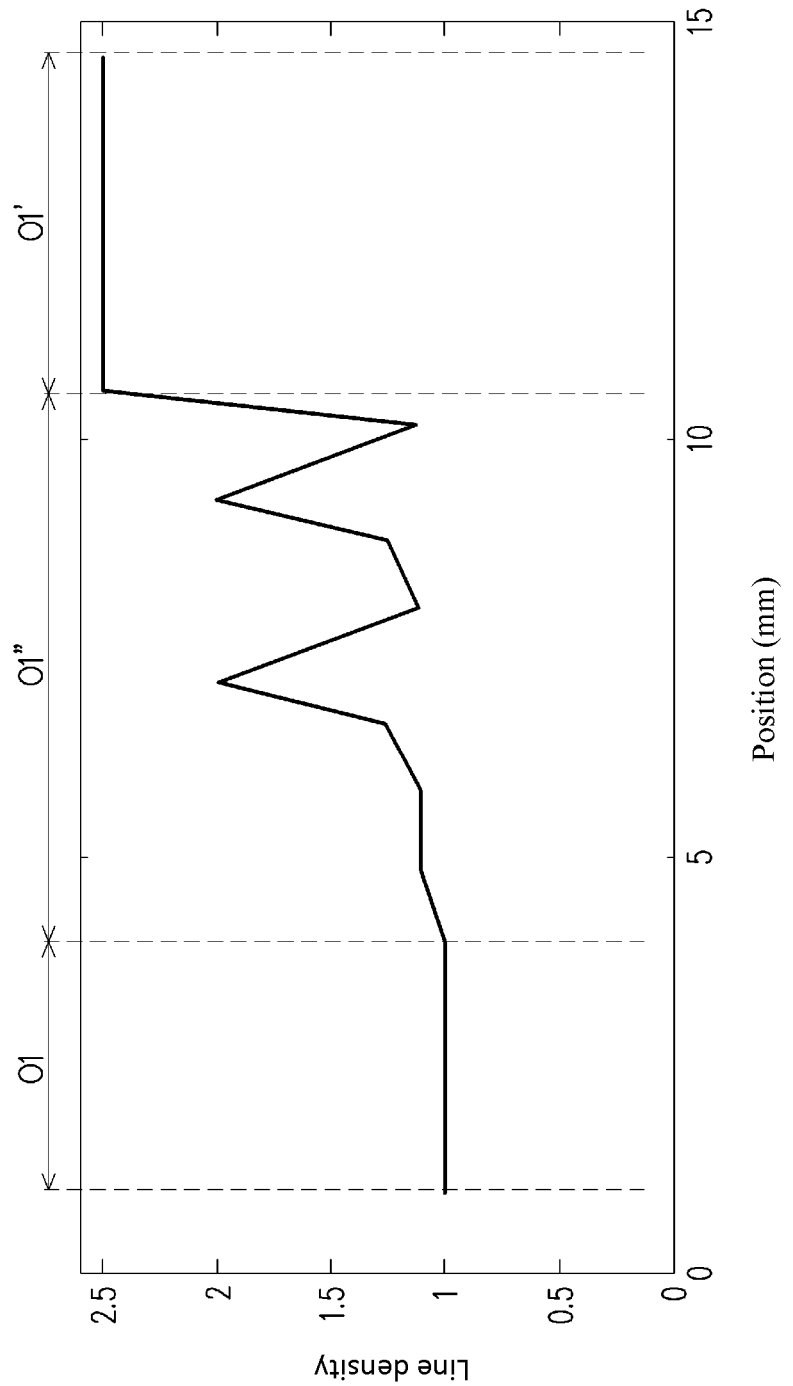
FIG. 6 is an example of optimizing a line density of reflective inclined surfaces in the embodiment of the invention.

FIG. 4 is an example of using Bézier curve to simulate a line density of reflective inclined surfaces in the embodiment of the invention. FIG. 5 is another example of using Bézier curve to simulate a line density of reflective inclined surfaces in the embodiment of the invention. FIG. 6 is an example of optimizing a line density of reflective inclined surfaces in the embodiment of the invention. In FIG. 4, FIG. 5 and FIG. 6, the horizontal axis indicates position in units of millimeter, and the vertical axis indicates line density in units of the number per millimeter. The smaller the value of the position, the closer to the light incident area; and the larger the value of the position, the farther from the light incident area. FIGS. 4-6 represent that the characteristics of the reflective inclined surfaces of the first optical waveguide and the reflective inclined surfaces of the second optical waveguide. The first optical waveguide is mentioned in following description as example.

Referring to FIG. 4 and FIG. 5 together, a distribution curve of the line density may be designed according to Bezier curve for the first reflective inclined surface 161 of the embodiment of the invention. However, a better method should be designed in accordance with the imaging effect, such as FIG. 6.

Referring to FIG. 6, first of all, the first reflective inclined surface 161 closest to the first light incident area E1 is used as a starting point. The next first reflective inclined surface 161 is disposed with a starting pitch P of 1 millimeter, for example, and whether an imaging image will show bright and dark stripes is then calculated. If not, at least one first reflective inclined surface 161 is disposed again at the starting pitch P, and the number of the at least one first reflective inclined surfaces 161 is counted until the imaging image shows bright and dark stripes. If yes, another stating pitch P is set (e.g., 1.1 millimeter), the next first reflective inclined surface 161 is disposed at said another starting pitch P, and whether the imaging image will show bright and dark stripes is calculated. Then, the above steps are repeated to calculate the number of the first reflective inclined surfaces 161, and so and so forth. The line density of the first reflective inclined surfaces 161 of this embodiment is shown in FIG. 6. In the first optical area O1, the line density of the first reflective inclined surfaces 161 is 1 per millimeter. In the first optical area O1', the line density of the first reflective inclined surfaces 161 is 2.5 per millimeter. Furthermore, the line number densities of the first reflective inclined surfaces 161 in the first optical area O1" show a non-increasing and non-decreasing oscillation distribution.

Based on the above, in the near-eye optical system 10 of the invention, by providing different line number densities or different pitches of the first reflective inclined surfaces 161 among the different first optical areas O1, O1' and O1" and making the width L of the first reflective inclined surface 161 less than or equal to the pitch P, the near-eye optical system 10 can make light incident at different angles on the eye E more uniformly, reduce the occurrence of bright and dark stripes, and provide good experience for the user.

Moreover, the image beam I may be in the light cone shape with different incident angles, and the projection device 400 can project the image beam I. Also, in this embodiment, two partial beams of the image beam I reflected by any adjacent two of the first reflective inclined surfaces 161 at least partially overlap with each other in a viewing angle range formed in the eye E of the user. Therefore, the imaging effect of the image beam I on the eye E is better so the image beam I can be uniformly imaged on the eye E. In other words, the light uniformity of the image beam I on the eye E may be increased, and light or dark stripes generated on the eye E may be reduced.

Figure 7:
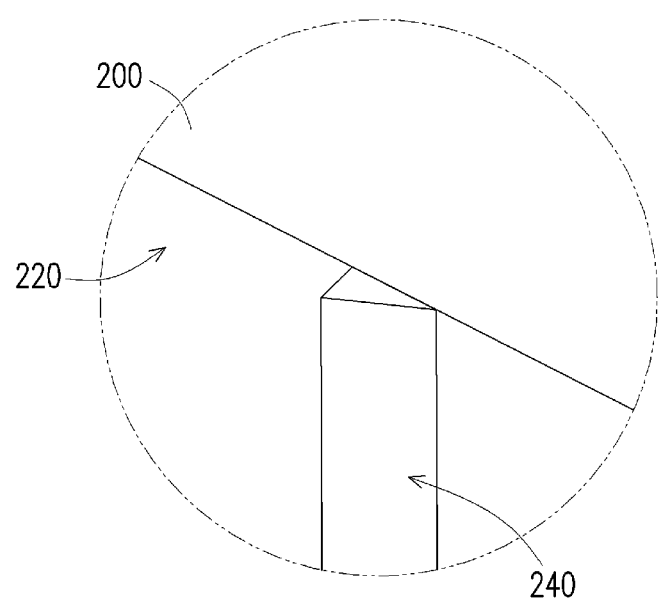
FIG. 7 is a partial enlarged view of the second optical waveguide of FIG. 1B at the third reflective inclined surface.

FIG. 7 is a partial enlarged view of the second optical waveguide of FIG. 1B at the third reflective inclined surface. Referring to FIG. 1A, FIG. 1B and FIG. 7 together, in this embodiment, the second optical waveguide 200 of the near-eye optical system 10 is configured to expand the image beam I in the second direction (e.g., the X direction). The second optical waveguide 200 includes the third surface 210, a fourth surface 220 and the third reflective inclined surfaces 240 formed on the fourth surface 220.

Figure 8:
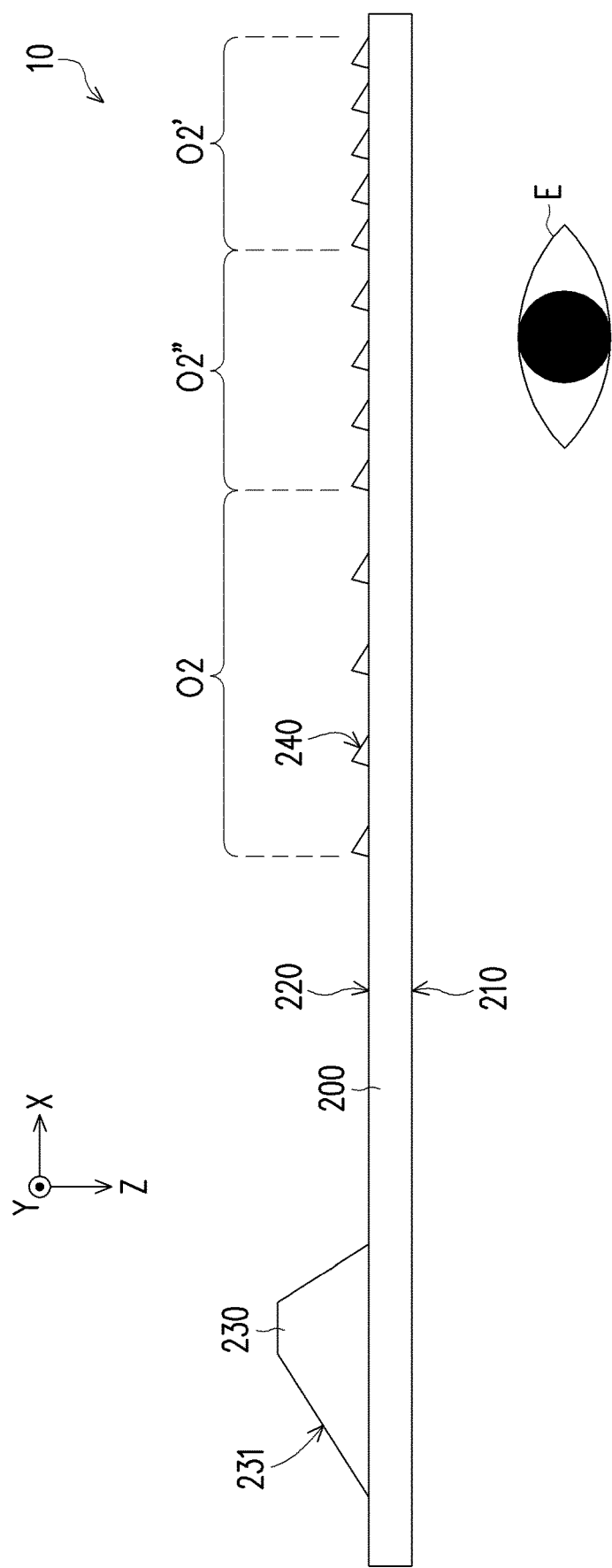
FIG. 8 is a cross sectional view of a second optical waveguide of FIG. 1B.

FIG. 8 is a cross sectional view of a second optical waveguide of FIG. 1B. In this embodiment, the fourth surface 220 has a second light incident area E2, the fourth surface 220 is a structure surface, for example. The second light incident area E2 is located in a transmission path of the image beam I from the second surface 120. The third surface 210 faces the second surface 120 and is opposite to the fourth surface 220. The third surface 210 is near-eye surface, for example. The third reflective inclined surfaces 240 are disposed on the fourth surface 220, located at another side of the second light incident area E2, and arranged along the second direction (X). The fourth surface 220 is sequentially divided into the second light incident area (light incident area) E2 and a plurality of second optical areas (optical area) O2, O2' and O2" along the second direction. The second light incident area E2 is located between the third surface (near-eye surface) 210 and the protruding structure 230.

In this embodiment, the second optical waveguide 200 further includes a fourth reflective inclined surface 231, which is disposed on the second light incident area E2 and configured to transmit the image beam I from the second light incident area E2 towards the second optical areas O2, O2' and O2". For example, the fourth reflective inclined surface 231 is a light incident area-reflective inclined surface. The fourth reflective inclined surface 231 is a surface of a protruding structure 230 at one side of the fourth surface 220. Furthermore, for allowing the image light beam I to be transmitted from the second light incident area E2 to the second optical areas O2, O2' and O2", the fourth reflective inclined surface 231 may be coated with a reflective layer. For allowing the image beam I to be transmitted to the eye E, the third reflective inclined surface 240 of the second optical waveguide 200 may be coated with a reflective layer, or the entire third reflective inclined surface 240 may also be coated with a reflective layer. In this way, the near-eye optical system 10 may be a VR (Virtual Reality) system. In an embodiment, the third reflective inclined surface 240 of the second optical waveguide 200 may be coated with a partly-transmissive and partly-reflective layer, or the fourth surface 220 and the third reflective inclined surface 240 may both be coated with a partly-transmissive and partly-reflective layer. In this way, the near-eye optical system 10 may be an AR (Augmented Reality) system, in which an ambient beam may be incident on the second optical waveguide 200 from the fourth surface 220 of the second optical waveguide 200, and then be transmitted to the human eye from the third surface 210.

In this embodiment, a line number density of the third reflective inclined surfaces 240 in the second optical area O2 closest to the second light incident area E2 in the second direction is less than a line number density of the third reflective inclined surfaces 240 in the second optical area O2' furthest from the second light incident area E2 in the second direction.

In an embodiment, the line number density of the third reflective inclined surfaces 240 in the second optical area O2 closest to the second light incident area E2 is a constant value, and the line number density of the third reflective inclined surfaces 240 in the second optical area O2' furthest from the second light incident area E2 is a constant value.

In this embodiment, the line number densities of the third reflective inclined surfaces 240 in at least one second optical area O2" between the second optical area O2 closest to the second light incident area E2 and the second optical area O2' furthest from the second light incident area E2 show a non-increasing and non-decreasing oscillation distribution.

In this embodiment, a width of each of the third reflective inclined surfaces 240 in the second direction is less than or equal to a pitch from the third reflective inclined surface 240 to the next third reflective inclined surface 240 in the second direction. The pitch is less than or equal to a pupil diameter of the eye E, and the pupil diameter is greater than or equal to 1 millimeter and less than or equal to 6 millimeter.

Referring to FIG. 8 again, in the other embodiment, the near-eye optical system 10 comprises the second optical waveguide 200 and the protruding structure 230. The near-eye optical system 10 further comprises a first optical waveguide. However, the first optical waveguide is different from the first optical waveguide 100 of FIG. 1. The first optical waveguide of FIG. 8 does not have the plurality of protruding microstructures 150 and the plurality of protruding microstructures 160. The first optical waveguide of FIG. 8 only transmits the image beam I into the second optical waveguide 200 in the transmission path of the image beam I. The first optical waveguide is located between the projection device and the second optical waveguide (optical waveguide).

In an embodiment, the line number density of the third reflective inclined surfaces 240 increases from being closer to the second light incident area E2 to being farther from the second light incident area E2 in the second direction.

Based on the above, in the near-eye optical system 10 of the invention, by providing different line number densities or different pitches of the third reflective inclined surfaces 240 among the different second optical areas O2, O2' and O2" and making the width of the third reflective inclined surface 240 less than or equal to the pitch, the near-eye optical system 10 can make light incident at different angles on the eye E more uniformly, reduce the occurrence of bright and dark stripes, and provide good experience for the user.

Moreover, as similar to the first reflective inclined surface 161 described above, two partial beams of the image beam I reflected by any adjacent two of the third reflective inclined surfaces 240 at least partially overlap with each other in a viewing angle range formed in the eye E of the user in this embodiment. Therefore, the imaging effect of the image beam I on the eye E is better so the image beam I can be uniformly imaged on the eye E. In other words, the light uniformity of the image beam I on the eye E may be increased, and light or dark stripes generated on the eye E may be reduced.

In addition, in the same manner as the above-mentioned design method of the first reflective inclined surfaces 161, the pitch between the third reflective inclined surfaces 240 in the embodiment of the invention may also be designed according to the manner of FIG. 4, FIG. 5 and FIG. 6, which is not repeated herein. It is worth mentioning that both the first reflective inclined surface 161 and the third reflective inclined surface 240 are composed of a plurality of prism columns.

In summary, the near-eye optical system of the invention has a plurality of reflective inclined surfaces, and a line number density of the first reflective inclined surfaces in the first optical areas closest to the first light incident area in the first direction is less than a line number density of the first reflective inclined surfaces in the first optical areas furthest from the first light incident area in the first direction. As a result, the near-eye optical system can make light incident at different angles on the eye more uniformly, reduce the occurrence of bright and dark stripes, and provide good experience for the user. Furthermore, the designer may design the near-eye optical system according to the distribution curve of the line number density of the optimized first reflective inclined surface, so that the user experience is better.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A near-eye optical system for receiving an image beam, comprising:
    an optical waveguide, configured to expand the image beam in a direction, and comprising:
        a near-eye surface;
        a structure surface, comprising a light incident area, opposite to the near-eye surface, wherein the light incident area is located in a transmission path of the image beam; and
        a plurality of reflective inclined surfaces, disposed on the structure surface, located at one side of the light incident area, and arranged along the direction, wherein the structure surface is sequentially divided into the light incident area and a plurality of optical areas along the direction, and a line number density of the reflective inclined surfaces in the optical area closest to the light incident area in the direction is less than a line number density of the reflective inclined surfaces in the optical area furthest from the light incident area in the direction, wherein the line number density of the reflective inclined surfaces of the at least one optical area between the optical area closest to the light incident area and the optical area furthest from the light incident area shows non-increasing and non-decreasing oscillation distributions, that is ranged between the line number density of the reflective inclined surfaces in the optical area closest to the light incident area and the line number density of the reflective inclined surfaces in the optical area furthest from the light incident area.

2. The near-eye optical system according to claim 1, wherein the optical waveguide further comprises a light incident area-reflective inclined surface, disposed on the light incident area, and configured to transmit the image beam from the light incident area towards the optical areas.

3. The near-eye optical system according to claim 1, wherein the line number density of the reflective inclined surfaces in the optical area closest to the light incident area is a constant value, and the line number density of the reflective inclined surfaces in the optical area furthest from the light incident area is a constant value.

4. The near-eye optical system according to claim 1, wherein two partial beams of the image beam reflected by any adjacent two of the reflective inclined surfaces at least partially overlap with each other in a viewing angle range formed in an eye of a user.

5. The near-eye optical system according to claim 4, wherein a width of each of the reflective inclined surfaces in the direction is less than or equal to a pitch from the reflective inclined surface to the next reflective inclined surface in the direction, the pitch is less than or equal to a pupil diameter of the eye, and the pupil diameter is greater than or equal to 1 millimeter and less than or equal to 6 millimeter.

6. The near-eye optical system according to claim 1, wherein the line number density of the reflective inclined surfaces increases from being closer to the light incident area to being farther from the light incident area in the direction.

7. The near-eye optical system according to claim 1, further comprising: a projection device, configured to emit the image beam, wherein the image beam from the projection device enters the optical waveguide via the light incident area.

8. The near-eye optical system according to claim 7, further comprising: a first optical waveguide, located in a transmission path of the image beam and disposed between the projection device and the optical waveguide.

9. A near-eye optical system according to claim 8, wherein the first optical waveguide is configured to expand the image beam in a first direction, and comprises:
a first surface, having a first light incident area;
a second surface, opposite to the first surface; and
a plurality of first reflective inclined surfaces, disposed on the first surface, located at one side of the first light incident area, and arranged along the first direction, wherein the first surface is sequentially divided into the first light incident area and a plurality of first optical areas along the first direction, and a line number density of the first reflective inclined surfaces in the first optical area closest to the first light incident area in the first direction is less than a line number density of the first reflective inclined surfaces in the first optical area furthest from the first light incident area in the first direction; and wherein
the optical waveguide is configured to expand the image beam in a second direction, the first direction is perpendicular to the second direction.

10. The near-eye optical system according to claim 9, wherein the line number density of the first reflective inclined surfaces in the first optical area closest to the first light incident area is a constant value, and the line number density of the first reflective inclined surfaces in the first optical area furthest from the first light incident area is a constant value.

11. The near-eye optical system according to claim 10, wherein the line number density of the first reflective inclined surfaces of the at least one first optical area between the first optical area closest to the first light incident area and the first optical area furthest from the first light incident area show non-increasing and non-decreasing oscillation distributions, that is ranged between the line number density of the first reflective inclined surfaces in the first optical area closest to the first light incident area and the line number density of the first reflective inclined surfaces in the first optical area furthest from the first light incident area.

12. The near-eye optical system according to claim 9, wherein two partial beams of the image beam reflected by any adjacent two of the first reflective inclined surfaces at least partially overlap with each other in a viewing angle range formed in an eye of a user.

13. The near-eye optical system according to claim 12, wherein a width of each of the first reflective inclined surfaces in the first direction is less than or equal to a pitch from the first reflective inclined surface to the next first reflective inclined surface in the first direction, the pitch is less than or equal to a pupil diameter of the eye, and the pupil diameter is greater than or equal to 1 millimeter and less than or equal to 6 millimeter.

14. The near-eye optical system according to claim 9, wherein the line number density of the first reflective inclined surfaces increases from being closer to the first light incident area to being farther from the first light incident area in the first direction.

15. The near-eye optical system according to claim 9, wherein the first optical waveguide further comprises a second beam splitting inclined surface, disposed on the first light incident area, and configured to transmit the image beam from the first light incident area towards the first optical areas.

\* \* \* \* \*